Sept. 21, 1926.  
W. R. GREEN  
1,600,629  
UNDERSLUNG TIRE CARRIER FOR TRUCKS  
Filed Nov. 1, 1923  2 Sheets-Sheet 2
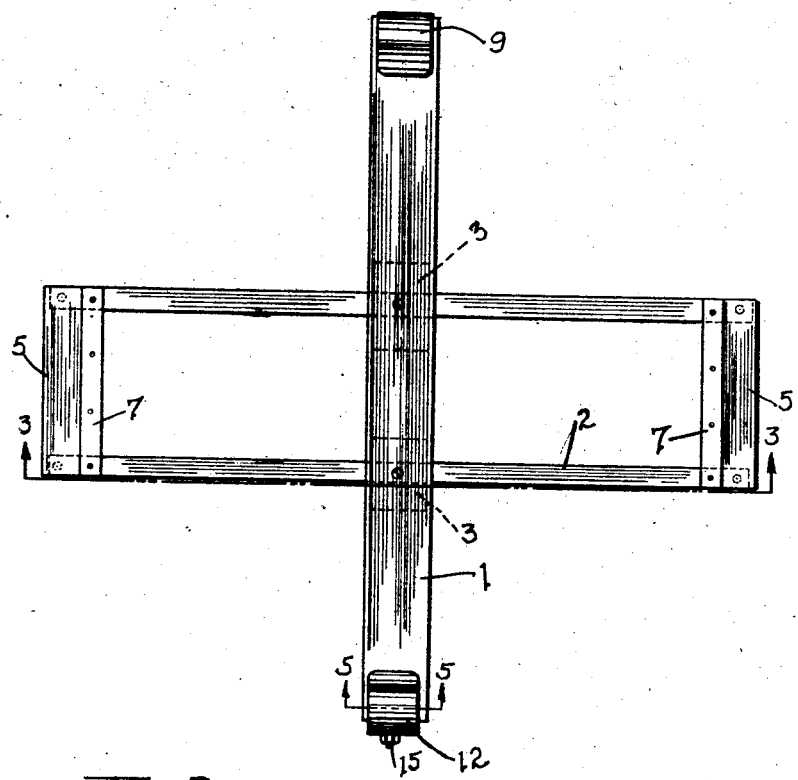
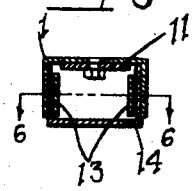
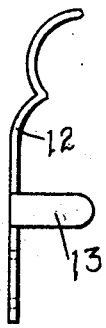
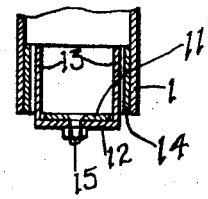
Witnesses  
Inventor  
Walter R. Green  
by  
Attys.

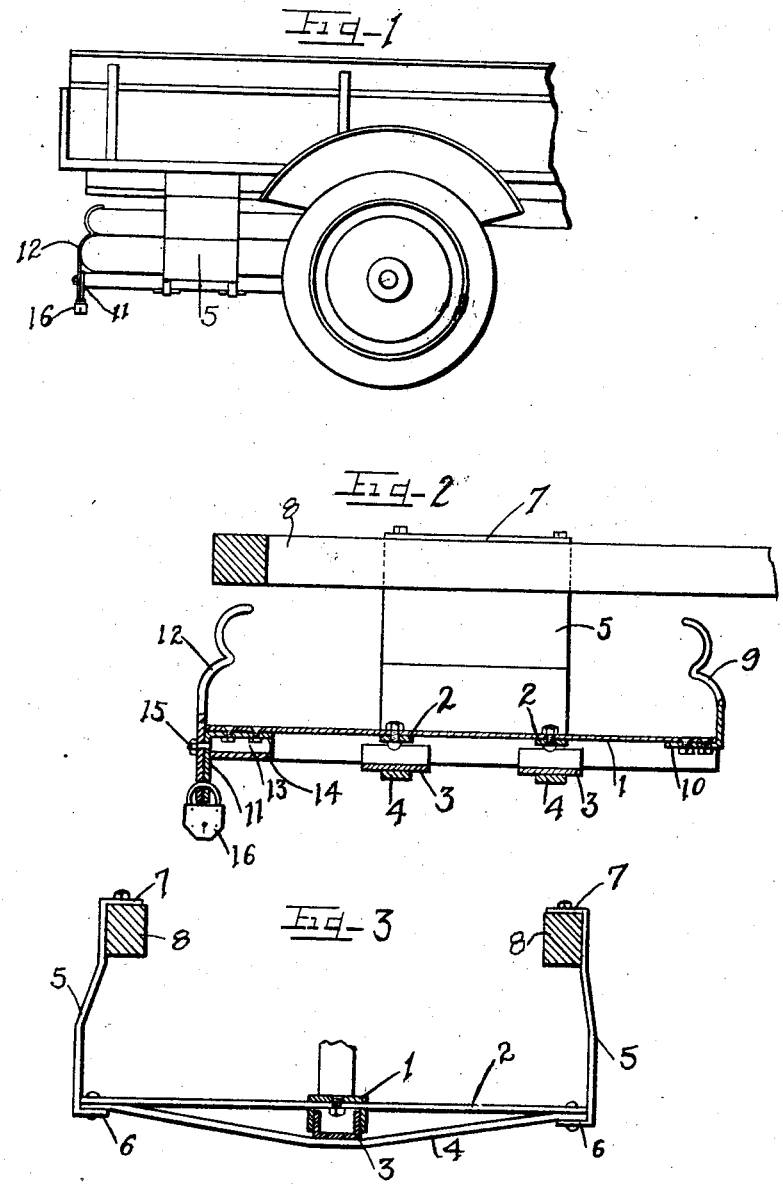

Patented Sept. 21, 1926.

1,600,629

UNITED STATES PATENT OFFICE.

WALTER R. GREEN, OF CHICAGO, ILLINOIS.

UNDERSLUNG TIRE CARRIER FOR TRUCKS.

Application filed November 1, 1923. Serial No. 672,055.

This invention relates to a tire carrier adapted for attachment to the bottom of a truck or vehicle with the provision of novel means for inserting and removing a tire and locking the same in the carrier against unauthorized removal.

The invention comprises the novel mechanism and combinations hereinafter described and more particularly pointed out and defined in the appended claims.

In the accompanying drawings, which illustrate a preferred embodiment of this invention and in which similar reference numerals refer to similar features in the different views.

Fig. 1 is a fragmentary elevational view of a truck showing the tire carrier suspended therebeneath.

Fig. 2 is an enlarged vertical section through the tire carrier taken in a longitudinal direction.

Fig. 3 is an enlarged vertical section of the tire carrier taken substantially upon the line 3—3 of Fig. 4.

Fig. 4 is an enlarged top plan view of the tire carrier.

Fig. 5 is an enlarged sectional view taken substantially upon the line 5—5 of Fig. 4.

Fig. 6 is an enlarged sectional view taken upon the line 6—6 of Fig. 5.

Fig. 7 is an edge elevational view of a tire retainer constituting part of the carrier.

The illustrated embodiment of this invention comprises a horizontal platform adapted for suspension beneath the body of the truck or vehicle. In the present instance, the platform consists of a longitudinally extending channel 1 and a transverse member connected thereto. The transverse member consists of a pair of spaced metal strips 2 which extend through suitable slots in the flanges of the channel 1. Short channel blocks 3 telescope within the channel 1 as shown in Figs. 2 and 3 directly under the strips 2 and truss members 4 extend below these channel blocks, the ends of the truss members being secured to the ends of strips 2 to form a trussed structure. Brackets 5 are secured to the ends of the strips 2. Each bracket is provided with a lower right angled attaching flange 6 that extends across both strips 2 and is bolted or otherwise secured thereto, and an upper right angled flange 7 that is adapted to hang upon the side beams 8 of the vehicle for suspending the carrier.

A resilient tire retainer 9 is secured upon one end of the longitudinal member 1 of the platform. This retainer is provided with a lower foot 10 that fits between the flanges of the channel and is bolted to the web of the channel. The retainer extends above the platform 1 to a sufficient extent to embrace a pair of tires and for this purpose it is provided with an upper concave or outwardly bowed portion to embrace the upper tire and an inwardly extending bead just below the concave portion which merges into a suitably curved portion to fit over the lower tire. Upon the opposite end of the channel 1 there is secured a depending lug 11 having an upper attaching foot extending between the flanges of the channel and secured to the web thereof. A resilient tire retainer 12 having its upper portion fashioned similarly to the retainer 9 is removably secured upon the depending lug 11. This retainer 12 is provided with a pair of spaced wing plates 13 that straddle the depending lug and fit between the flanges of a short inverted channel block 14 secured within the channel of the member 1. A bolt 15 extends through the retainer 12 and lug 11 for supporting the retainer thereon, and below the bolt 15 the retainer and lug 11 are provided with registering apertures for receiving the hasp of a padlock 16 or the like for locking the retainer to the platform against unauthorized removal.

The carrier is suspended by the brackets 5 from the side beams or chassis of the vehicle so that the removable tire retainer 12 will be directed toward the rear of the vehicle so as to be accessible. The tires may be inserted or removed from the carrier by removing the tire retainer 12, and this can be readily accomplished by removing the bolt 15 and padlock 16 as is obvious.

I am aware that numerous details of construction may be varied through a wide range without departing from the principles of this invention, and I therefore do not purpose limiting the patent granted otherwise necessitated by the prior art.

I claim as my invention:

1. In a tire carrier a transverse member having vertical attaching brackets, a longitudinally extending channel secured to said member, a tire retainer secured upon an end of said channel, a depending lug secured to the other end of said channel, a second tire retainer having wing plates straddling said lug and positioned within said channel and means for removably securing said second retainer to said lug.

2. In an underslung tire carrier, a transverse trussed member, attaching brackets secured to the ends of said member, a longitudinally extending member having slots through which said transverse member passes, a tire retainer secured to one end of said longitudinally extending member, a depending lug at the other end of said longitudinally extending member, and a second tire retaining member having means embracing said lug and removably attached thereto.

In testimony whereof I have hereunto subscribed my name.

WALTER R. GREEN.